US011460338B2

(12) United States Patent
Yaoi

(10) Patent No.: US 11,460,338 B2
(45) Date of Patent: Oct. 4, 2022

(54) WEIGHING APPARATUS THAT REDUCES POWER CONSUMPTION DURING OPENING AND CLOSING OF A HOPPER GATE

(71) Applicant: Ishida Co., Ltd., Kyoto (JP)

(72) Inventor: Yoshifumi Yaoi, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 121 days.

(21) Appl. No.: 17/064,322

(22) Filed: Oct. 6, 2020

(65) Prior Publication Data
US 2021/0102833 A1   Apr. 8, 2021

(30) Foreign Application Priority Data

Oct. 7, 2019 (JP) .............................. JP2019-184331

(51) Int. Cl.
*G01G 13/16* (2006.01)
*G01G 19/387* (2006.01)

(52) U.S. Cl.
CPC .......... *G01G 13/16* (2013.01); *G01G 19/387* (2013.01)

(58) Field of Classification Search
CPC ..... G01G 13/16; G01G 19/387; G01G 19/393
See application file for complete search history.

(56) References Cited

U.S. PATENT DOCUMENTS

| 4,705,125 A | 11/1987 | Yamada et al. |
| 9,573,755 B2 | 2/2017 | Nagai |
| 2003/0111274 A1* | 6/2003 | Yonetsu ............... G01G 19/393 |
| | | 177/25.18 |

FOREIGN PATENT DOCUMENTS

| JP | 2011-007525 A | 1/2011 |
| JP | 2013167594 A | 8/2013 |

OTHER PUBLICATIONS

The extended European search report issued by the European Patent Office dated Feb. 22, 2021, which corresponds to European Patent Application No. 20199448.0-1001 and is related to U.S. Appl. No. 17/064,322.

\* cited by examiner

*Primary Examiner* — Randy W Gibson
(74) *Attorney, Agent, or Firm* — Studebaker & Brackett PC

(57) ABSTRACT

[Problem] To provide a combination weighing apparatus that reduces power consumption during opening and closing operations of a hopper gate.
[Solution] In a combination weighing apparatus 1, a control unit 70 controls a stepping motor 60 via a control signal that is input to the stepping motor 60. The control signal that is input to the stepping motor 60 is a voltage value corresponding to a desired current value. The control unit changes the control signal to the stepping motor 60 in conjunction with a change in the settings of the opening and closing speed of the gate 20. As a result, it becomes possible to supply power needed for the operation of the gate 20, and power can be saved.

7 Claims, 14 Drawing Sheets

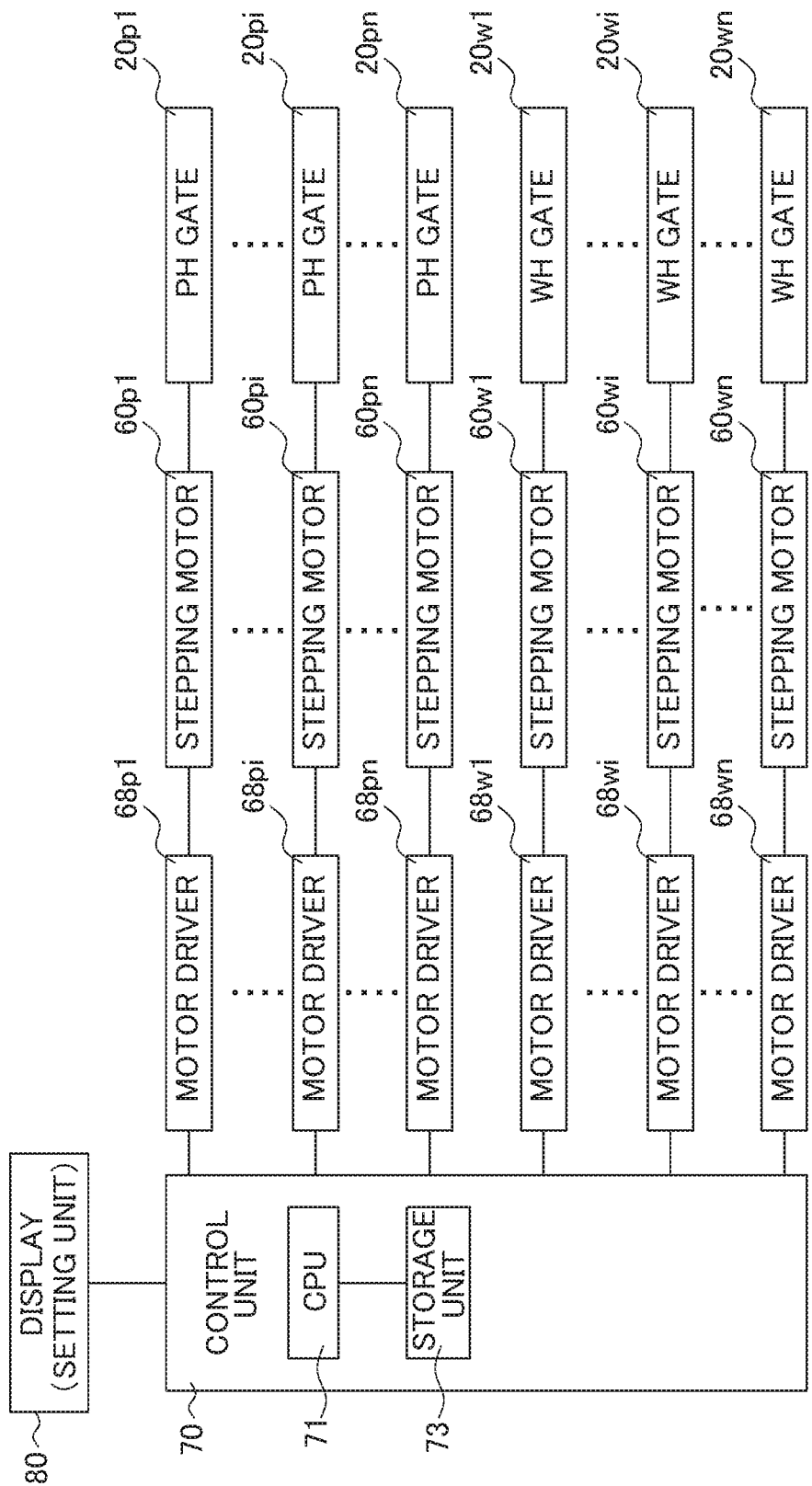
F I G. 4 A

| SECTION NUMBER | ROTATION INTERVAL [%] | ROTATION INTERVAL [DEGREES] | SPEED [r/m] | HOLD TIME [msec] | SLOW START | SLOW STOP |
|---|---|---|---|---|---|---|
| 1 | 0~80 | 0~144 | +140 | 0 | 0 | 0 |
| 2 | 80~100 | 144~180 | +100 | 0 | 0 | 0 |
| 3 | 100~50 | 180~90 | -140 | 0 | 0 | 0 |
| 4 | 50~30 | 90~54 | -105 | 0 | 0 | 0 |
| 5 | 30~10 | 54~18 | -100 | 0 | 0 | 0 |
| 6 | 10~0 | 18~0 | -190 | 0 | 0 | 0 |
| 7 | 0 | 0 | 0 | | | |
| 8 | 0 | 0 | 0 | | | |

SET MOTOR DRIVE CURRENT PATTERN

F I G. 5

| LOCATION [%] | LOCATION [DEGREES] | CHANGE IN SPEED [r/m] | CURRENT LEVELS DUE TO MECHANICAL FACTORS [full/half/eco1] | CURRENT LEVELS DUE TO MECHANICAL FACTORS + ACCELERATION FACTORS [full/half/eco1] | CURRENT LEVEL |
|---|---|---|---|---|---|
| 0 | 0 | 0→+140 | eco1 | full | +2 |
| 0~80 | 0~144 | 0 | eco1→half→full→half | full→eco1→half→half→full | |
| 80 | 144 | +140→+100 | half | full | +1 |
| 80~100 | 144~180 | 0 | half→eco1 | full→half→eco1→full | |
| 100 | 180 | +100→-140 | eco1 | full | +2 |
| 100~50 | 180~90 | 0 | eco1 | full→eco1→half | |
| 50 | 90 | -140→-105 | eco1 | half | +1 |
| 50~30 | 90~54 | 0 | eco1 | half→eco1 | |
| 30 | 54 | -105→-100 | eco1 | eco1 | +0 |
| 30~10 | 54~18 | 0 | eco1 | eco1→full | |
| 10 | 18 | -100→-190 | eco1 | full | +2 |
| 10~0 | 18~0 | 0 | eco1 | full | |

FIG. 6A

| DEFAULT VALUES | | | | AFTER BEING CHANGED | | | |
|---|---|---|---|---|---|---|---|
| SECTION NUMBER | ROTATION INTERVAL [%] | ROTATION INTERVAL [DEGREES] | CURRENT SETTING [full/half/eco1] | SECTION NUMBER | ROTATION INTERVAL [%] | ROTATION INTERVAL [DEGREES] | CURRENT SETTING [full/half/eco1] |
| 1 | 0~15 | 0~27 | eco1 | 1 | 0~11 | 0~20 | full |
| 2 | 15~35 | 27~63 | half | 2 | 11~17 | 20~30 | eco1 |
| 3 | 35~65 | 63~117 | full | 3 | 17~33 | 30~60 | half |
| 4 | 65~85 | 117~153 | half | 4 | 33~67 | 60~120 | full |
| 5 | 85~100 | 153~180 | eco1 | 5 | 67~75 | 120~135 | half |
| 6 | 100~0 | 180~0 | eco1 | 6 | 75~86 | 135~155 | full |
| 7 | 0 | 0 | 0 | 7 | 86~89 | 155~160 | half |
| 8 | 0 | 0 | 0 | 8 | 89~94 | 160~170 | eco1 |
| 9 | 0 | 0 | 0 | 9 | 94~100 | 170~180 | full |
| 10 | 0 | 0 | 0 | 10 | 100~92 | 180~165 | full |
| 11 | 0 | 0 | 0 | 11 | 92~56 | 165~100 | eco1 |
| 12 | 0 | 0 | 0 | 12 | 56~42 | 100~75 | half |
| 13 | 0 | 0 | 0 | 13 | 42~17 | 75~30 | eco1 |
| 14 | 0 | 0 | 0 | 14 | 17~0 | 30~0 | full |
| 15 | 0 | 0 | 0 | 15 | 0 | 0 | 0 |
| 16 | 0 | 0 | 0 | 16 | 0 | 0 | 0 |

FIG. 6B

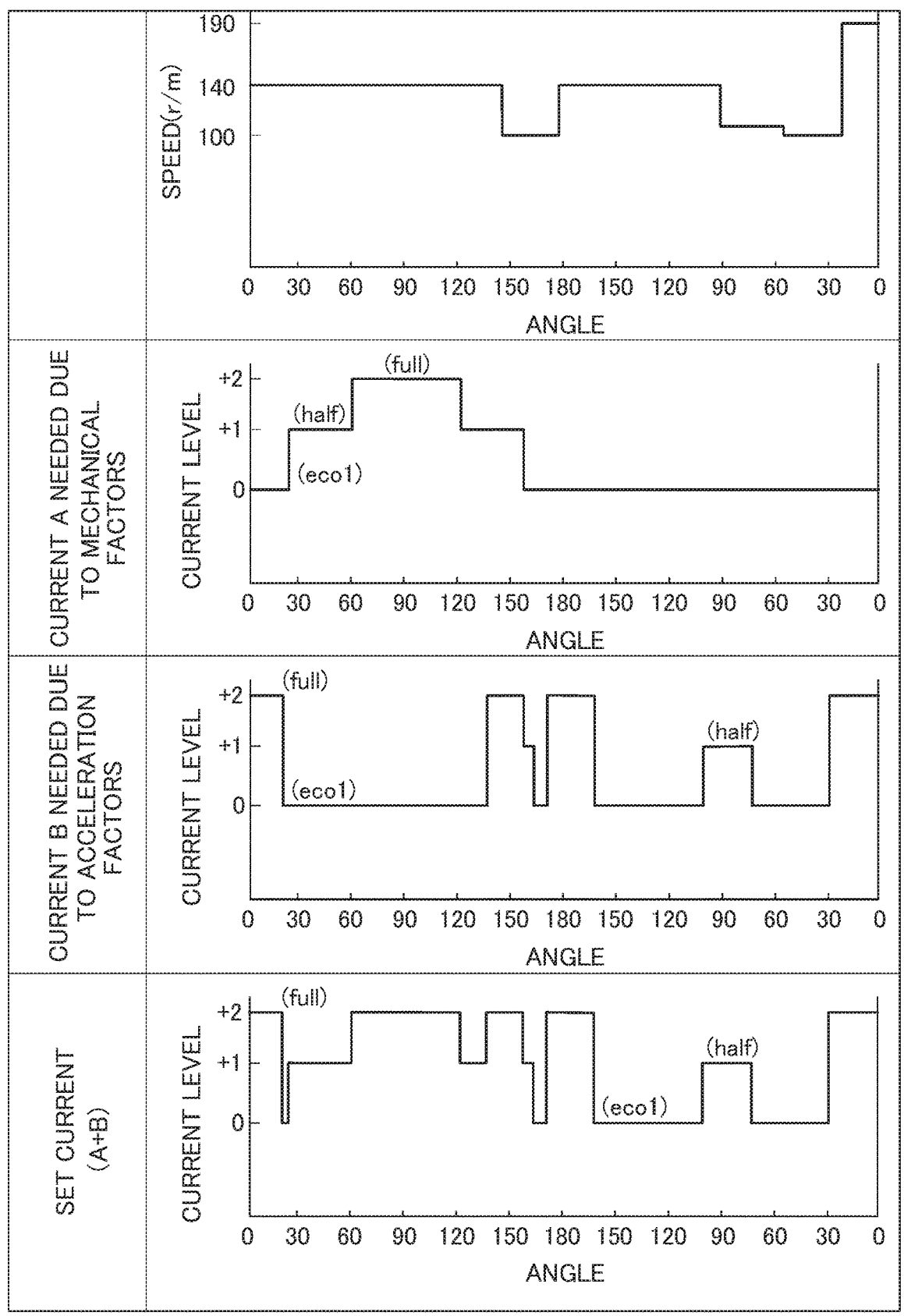
F I G. 7

DEFAULT VALUES

| SECTION NUMBER | ROTATION INTERVAL [%] | ROTATION INTERVAL [DEGREES] | SPEED [r/m] | HOLD TIME [msec] | SLOW START | SLOW STOP | CURRENT SETTING [full/half/eco1] |
|---|---|---|---|---|---|---|---|
| 1 | 0~80 | 0~144 | +140 | 0 | 0 | 0 | full |
| 2 | 80~100 | 144~180 | +100 | 0 | 0 | 0 | half |
| 3 | 100~50 | 180~90 | -140 | 0 | 0 | 0 | eco1 |
| 4 | 50~30 | 90~54 | -105 | 0 | 0 | 0 | eco1 |
| 5 | 30~10 | 54~18 | -100 | 0 | 0 | 0 | eco1 |
| 6 | 10~0 | 18~0 | -190 | 0 | 0 | 0 | full |
| 7 | 0 | 0 | 0 | 0 | 0 | 0 | 0 |
| 8 | 0 | 0 | 0 | 0 | 0 | 0 | 0 |

F I G. 8

| LOCATION [%] | LOCATION [DEGREES] | CHANGE IN SPEED [r/m] | CURRENT LEVELS DUE TO MECHANICAL FACTORS [full/half/eco1] | CURRENT LEVELS DUE TO MECHANICAL FACTORS + ACCELERATION FACTORS [full/half/eco1] | CURRENT LEVEL |
|---|---|---|---|---|---|
| 0 | 0 | 0→+140 | full | full | +2 |
| 0~80 | 0~144 | 0 | full | full | |
| 80 | 144 | +140→+100 | full→half | full | +1 |
| 80~100 | 144~180 | 0 | half | full→half→full | |
| 100 | 180 | +100→-140 | half→eco1 | full | +2 |
| 100~50 | 180~90 | 0 | eco1 | full→eco1→half | |
| 50 | 90 | -140→-105 | eco1 | half | +1 |
| 50~30 | 90~54 | 0 | eco1 | half→eco1 | |
| 30 | 54 | -105→-100 | eco1 | eco1 | +0 |
| 30~10 | 54~18 | 0 | eco1 | eco1→full | |
| 10 | 18 | -100→-190 | eco1→full | full | +2 |
| 10~0 | 18~0 | 0 | full | full | |

FIG. 9A

AFTER BEING CHANGED

| SECTION NUMBER | ROTATION INTERVAL [%] | ROTATION INTERVAL [DEGREES] | SPEED [r/m] | HOLD TIME [msec] | SLOW START | SLOW STOP | CURRENT SETTING [full/half/eco1] |
|---|---|---|---|---|---|---|---|
| 1 | 0~80 | 0~144 | +140 | 0 | 0 | 0 | full |
| 2 | 80~86 | 144~170 | +100 | 0 | 0 | 0 | half |
| 3 | 86~100 | 170~180 | +100 | 0 | 0 | 0 | full |
| 4 | 100~91 | 180~165 | −140 | 0 | 0 | 0 | full |
| 5 | 91~56 | 165~100 | −140 | 0 | 0 | 0 | eco1 |
| 6 | 56~50 | 100~90 | −140 | 0 | 0 | 0 | half |
| 7 | 50~42 | 90~75 | −105 | 0 | 0 | 0 | half |
| 8 | 42~30 | 75~54 | −105 | 0 | 0 | 0 | eco1 |
| 9 | 30~17 | 54~30 | −100 | 0 | 0 | 0 | eco1 |
| 10 | 17~11 | 30~20 | −100 | 0 | 0 | 0 | full |
| 11 | 11~0 | 20~0 | −190 | 0 | 0 | 0 | full |

FIG. 9B

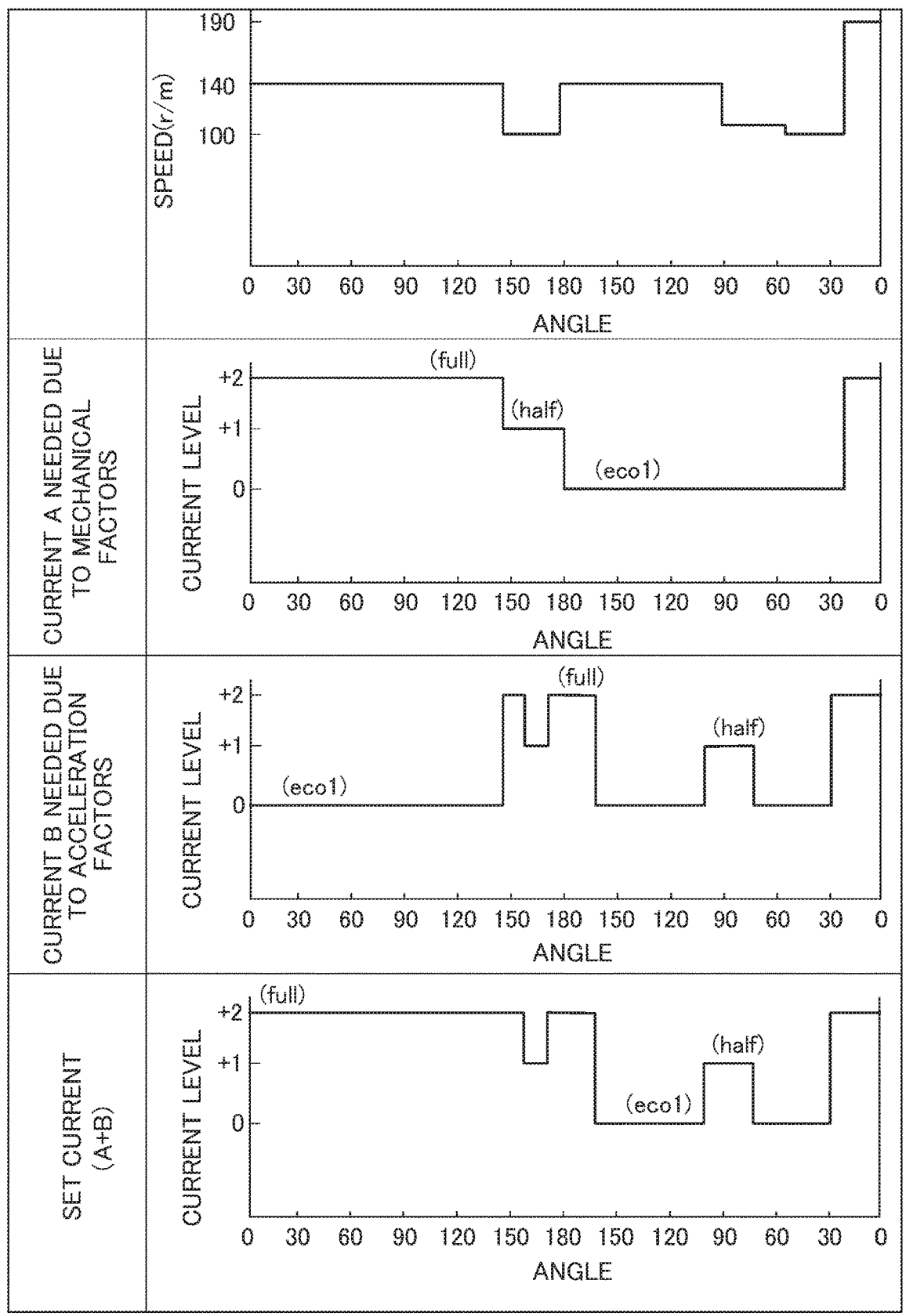
F I G. 10

WEIGHING APPARATUS THAT REDUCES POWER CONSUMPTION DURING OPENING AND CLOSING OF A HOPPER GATE

BACKGROUND

Technical Field

The present invention relates to a weighing apparatus, and particularly relates to a combination weighing apparatus that feeds product to be weighed to plural product bins, weighs the product in each of the product bins, and selects a combination of product bins whose combined product meets a target combined mass.

Related Art

In recent years, combination weighing apparatuses configured to feed product to be weighed to plural product bins called hoppers, weigh the product in each of the product bins, select a combination of product bins whose combined product meets a target combined mass, and involve them in that combination have become widespread. For example, patent document 1 (JP-A No. 2013-167594) discloses a combination weighing apparatus that utilizes drive currents $0 \leq I1 < I2 < I3$ for current applied to a drive unit of a hopper gate and which, by using drive current I1 when holding the hopper gate in a closed state, using drive current I2 when holding the hopper gate in an open state, and using drive current I3 when driving the hopper gate, reduces power consumption in the drive unit of the hopper gate.

SUMMARY OF INVENTION

Technical Problem

However, in the above weighing apparatus, the drive current that drives the hopper gate to open and close is controlled to a fixed value despite the fact that the necessary torque changes depending on the open/closed position of the hopper gate, and the maximum value of drive current needed to cause the hopper gate to operate is employed. Therefore, during the opening and closing operations of the hopper gate, the maximum drive current always continues to be supplied, leading to wasteful power consumption.

It is a problem of the present invention to provide a combination weighing apparatus that reduces power consumption during opening and closing operations of a hopper gate.

Solution to Problem

A weighing apparatus pertaining to a first aspect of the invention includes a hopper, a drive unit, and a control unit. The hopper has an opening and closing gate and, by opening and closing the gate, temporarily retains and thereafter discharges product that has been fed thereto from outside. The drive unit causes the gate to open and close. The control unit controls the drive unit via a control signal. The control unit changes the control signal to the drive unit in conjunction with a change in the setting of the opening and closing speed of the gate.

In this weighing apparatus, the power needed by the drive unit during the series of operations in which the gate shifts from the closed state to the open state changes in accordance with the operations of the gate, such as "startup," the "opening operation of the gate," the "stopping of the gate in the open position," the "anchoring of the gate in the open position," "startup," the "closing operation of the gate," and the "stopping of the gate in the closed position." If the power supplied to the drive unit were fixed to match its value when the drive unit requires the most power, stable operations of the gate are easily obtained, but this leads to wasteful power consumption. Thus, by changing the control signal to the drive unit in conjunction with a change in the setting of the opening and closing speed of the gate, it becomes possible to supply power needed for the operation of the gate, and power can be saved.

A weighing apparatus pertaining to a second aspect of the invention is the weighing apparatus pertaining to the first aspect, further including a setting unit that sets or changes the opening and closing speed of the gate.

In this weighing apparatus, by providing the setting unit, it becomes possible to reset the opening and closing speed of the gate in a case where the (default) opening and closing speed is unsuitable. The necessary power becomes clear as a result of an optimum opening and closing speed being set, and wasteful supply of power can be avoided so that power can be saved.

A weighing apparatus pertaining to a third aspect of the invention is the weighing apparatus pertaining to the first aspect or the second aspect, wherein a period in which the gate shifts from a closed state to an open state is divided into plural intervals. The opening and closing speed of the gate is set per each of the intervals.

In this weighing apparatus, the period in which the gate shifts from the closed state to the open state is divided into plural intervals, so opening and closing speeds suited to the state of the gate in those intervals can be set. The necessary power becomes clear as a result of optimum opening and closing speeds being set, and wasteful supply of power can be avoided so that power can be saved.

A weighing apparatus pertaining to a fourth aspect of the invention is the weighing apparatus pertaining to the third aspect, wherein the control signal is set per each of the opening and closing speeds of the gate.

In this weighing apparatus, there is a control signal corresponding to each of the opening and closing speeds, so when an opening and closing speed is changed, the control signal changes to the control signal corresponding to the opening and closing speed that has been changed, so the opening and closing speed is automatically controlled.

A weighing apparatus pertaining to a fifth aspect of the invention is the weighing apparatus pertaining to the fourth aspect, wherein when the opening and closing speed of the gate has been changed in any interval of the plural intervals, only the control signal corresponding to the interval in which the opening and closing speed of the gate was changed is changed.

In this weighing apparatus, in a case where, for example, there is an interval in which power is being wastefully consumed, it suffices to simply change the set value of the opening and closing speed of the gate in that interval.

A weighing apparatus pertaining to a sixth aspect of the invention is the weighing apparatus pertaining to the fourth aspect, wherein the control unit calculates the control signal that accords with the opening and closing speed of the gate.

It will be noted regarding the signal value of the control signal that values found by calculation per opening and closing speed beforehand may also be tabulated.

A weighing apparatus pertaining to a seventh aspect of the invention is the weighing apparatus pertaining to the first aspect or the second aspect, wherein the control unit increases the control signal in a case where the opening and closing speed of the gate has become faster than the opening and closing speed that was utilized when generating the control signal that was initially set. Furthermore, the control unit decreases the control signal in a case where the opening and closing speed of the gate has become slower than the opening and closing speed that was utilized when generating the control signal that was initially set.

Advantageous Effects of Invention

The weighing apparatus pertaining to the invention changes the control signal to the drive unit in conjunction with a change in the setting of the opening and closing speed of the gate, whereby it becomes possible to supply power needed for the operation of the gate, and power can be saved.

BRIEF DESCRIPTION OF THE DRAWINGS

FIG. 4A is a block diagram for describing electrical connections in the combination weighing apparatus pertaining to the embodiment;

FIG. 5 is a table showing the setting status of speeds of the stepping motor;

FIG. 6A is a table showing "Current Levels due to Mechanical Factors" and "Current Levels due to Mechanical Factors+Acceleration Factors" relative to the angle of rotation in one cycle of the stepping motor;

FIG. 6B is a table showing the setting status of current values per interval;

FIG. 7 is a chart in which a graph showing "Speed" versus the angle of rotation, a graph showing "Current A due to Mechanical Factors" versus the angle of rotation, a graph showing "Current B due to Acceleration Factors" versus the angle of rotation, and a graph showing "Set Current" versus the angle of rotation in one cycle of the stepping motor are arranged sequentially from the top and collectively displayed;

FIG. 8 is a table showing the setting status of current values per interval at an initial setting stage;

FIG. 9A is a table showing "Current Levels due to Mechanical Factors" and "Current Levels due to Mechanical Factors+Acceleration Factors" relative to the angle of rotation in one cycle of the stepping motor;

FIG. 9B is a table showing the setting status of current values per interval after a change in settings; and FIG. 10 is a chart in which a graph showing "Speed" versus the angle of rotation, a graph showing "Current A due to Mechanical Factors" versus the angle of rotation, a graph showing "Current B due to Acceleration Factors" versus the angle of rotation, and a graph showing "Set Current" versus the angle of rotation in one cycle of the stepping motor are arranged sequentially from the top and collectively displayed.

DETAILED DESCRIPTION

An embodiment of the invention will be described with reference to the drawings. The embodiment described below is a specific example of the invention and is not intended to limit the technical scope of the invention.

(1) Configuration of Combination Weighing Apparatus 1

Figure 1:
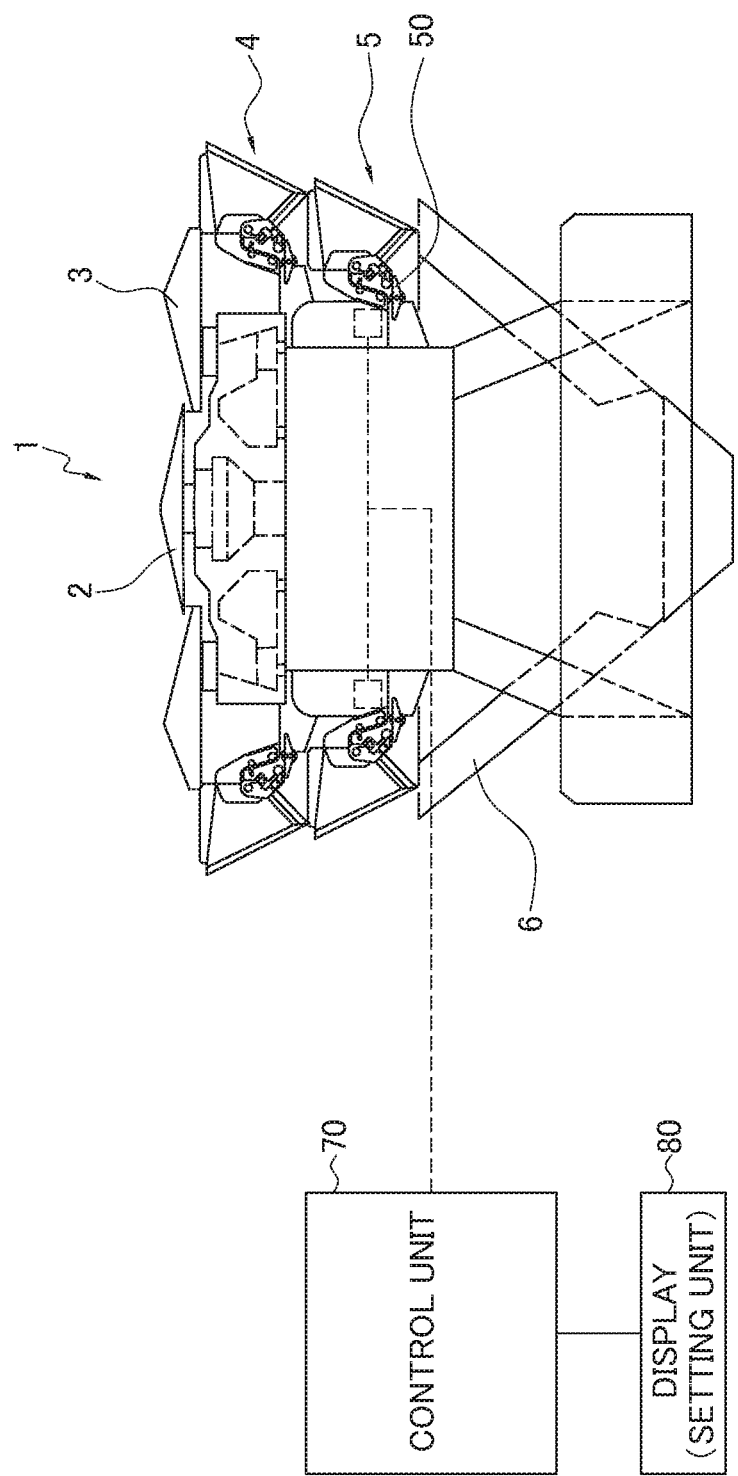
FIG. 1 is a front view of a combination weighing apparatus serving as a weighing apparatus pertaining to an embodiment of the invention.

FIG. 1 is a front view of a combination weighing apparatus 1 serving as a weighing apparatus pertaining to an embodiment of the invention. Referring to FIG. 1, the combination weighing apparatus 1 weighs, with plural weigh hoppers 5, weights of product and combines the values of the weights that have been weighed by each of the weigh hoppers 5 so as to meet a predetermined total weight. The combination weighing apparatus 1 discharges downward the product with the predetermined total weight it has combined.

Specifically, product that is product to be weighed is conveyed above the combination weighing apparatus 1. The product is then placed on a dispersion feeder 2 and radially dispersed by vibration of the dispersion feeder 2.

The product is sent to plural pool hoppers 4, which are circumferentially disposed via radial troughs 3 that come after the dispersion feeder 2. There the product is temporarily pooled, and thereafter the product is fed to the weigh hoppers 5 positioned under the pool hoppers 4.

The weights of the product that has been fed to the weigh hoppers 5 are measured by load cells (weight detectors) provided for each of the weigh hoppers 5. Then, a combination of the weigh hoppers 5 from which the product is to be discharged to meet a weight or quantity in an allowable range is calculated on the basis of the measured weights of the product in each of the weigh hoppers 5. On the basis of that result, several of the weigh hoppers 5 discharge the product to a collection discharge chute 6.

(2) Pool Hoppers 4 and Weigh Hoppers 5

As shown in FIG. 1, the pool hoppers 4 and the weigh hoppers 5 have substantially the same shape, so here they will be described using a weigh hopper 5 as an example.

Figure 2:
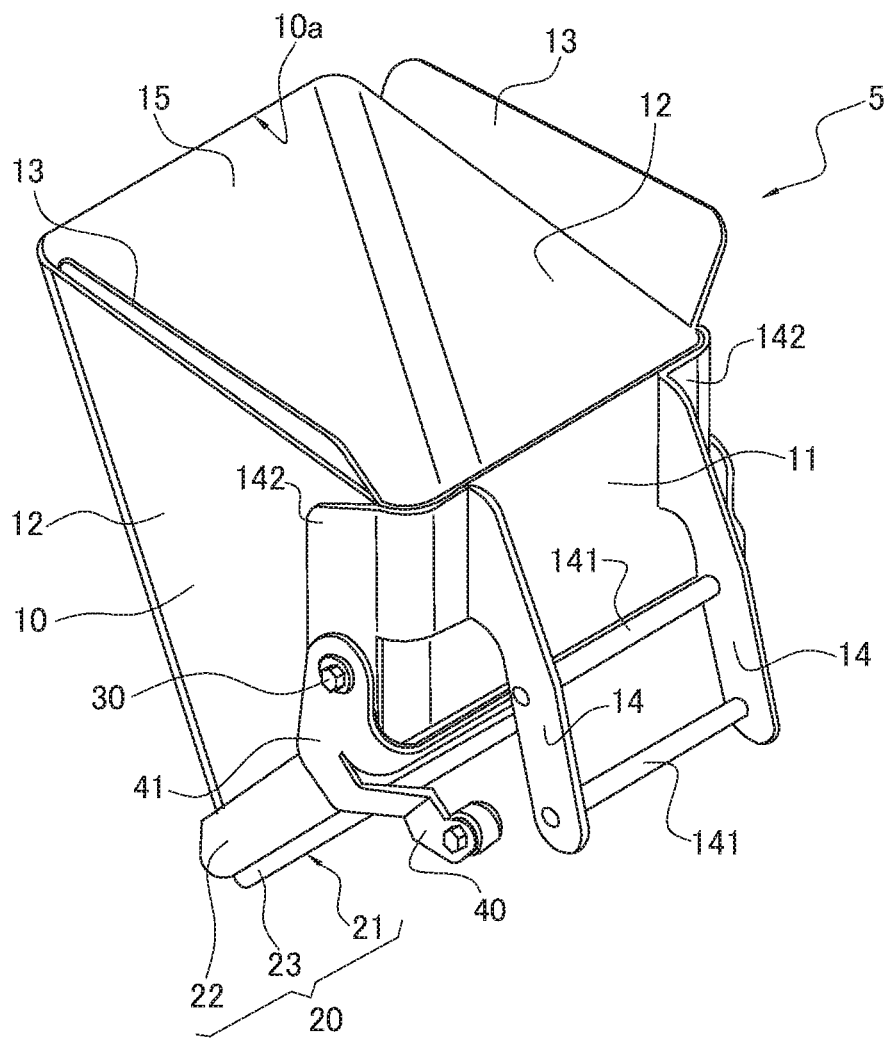
FIG. 2 is a perspective view of the outward appearance of a weigh hopper.
Figure 3A:
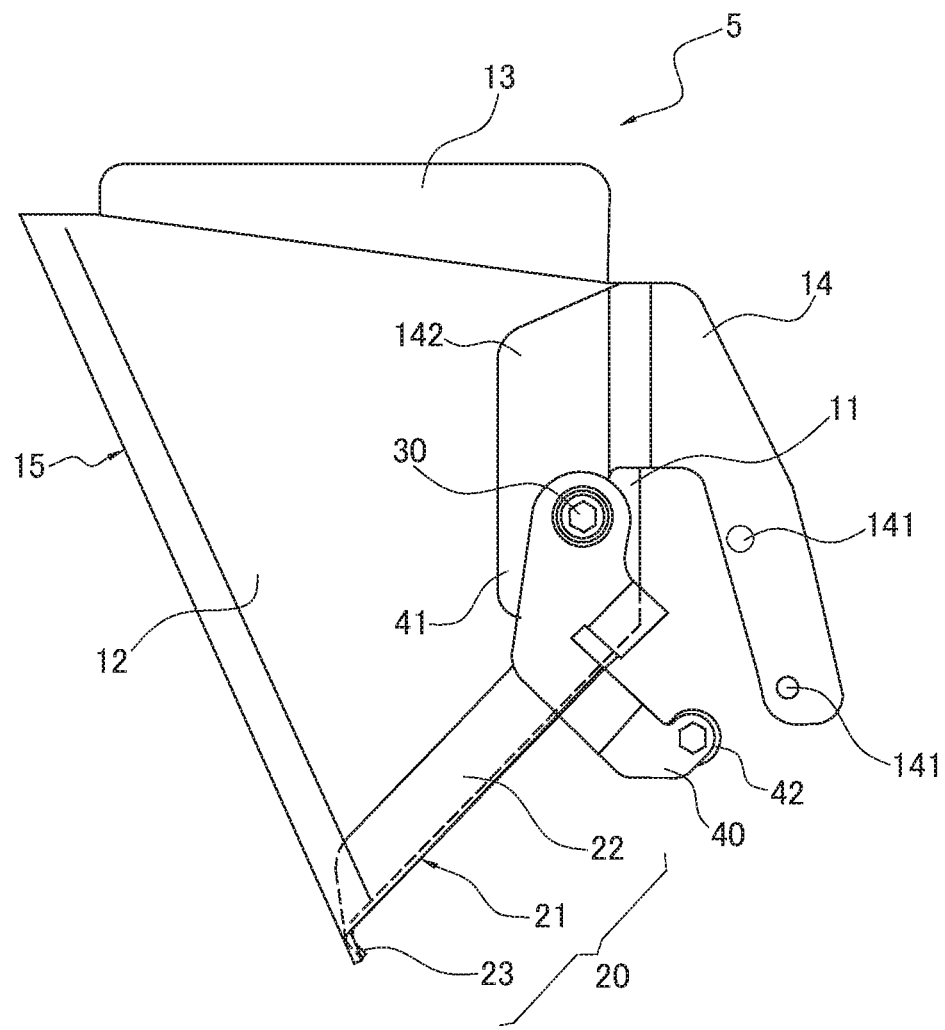
FIG. 3A is a side view of the weigh hopper in a state in which a gate is closed.
Figure 3B:
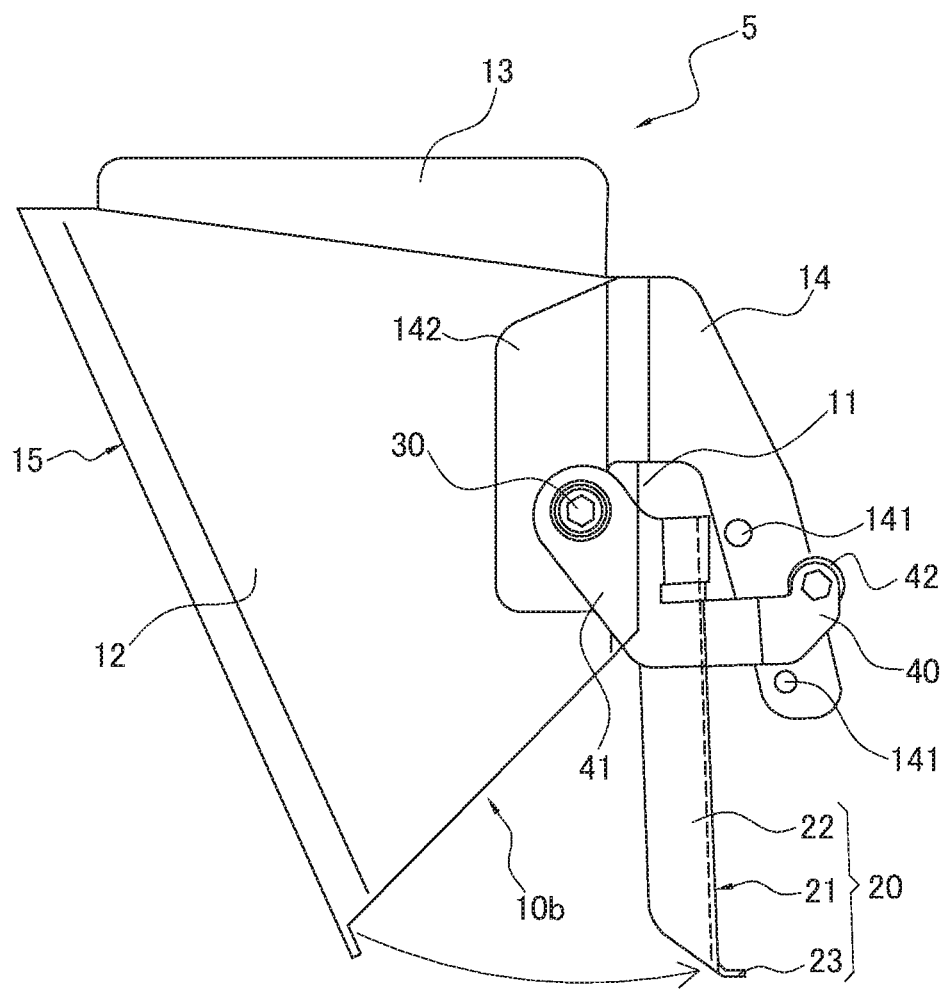
FIG. 3B is a side view of the weigh hopper in a state in which the gate is open.

FIG. 2 is a perspective view of the outward appearance of the weigh hopper 5. FIG. 3A is a side view of the weigh hopper 5 in a state in which a gate 20 is closed. FIG. 3B is a side view of the weigh hopper 5 in a state in which the gate 20 is open.

Referring to FIG. 2, FIG. 3A, and FIG. 3B, the weigh hopper 5 includes a body 10, the gate 20, support shafts 30, and a lever 40.

(2-1) Body 10

The body 10 is made of stainless steel. The body 10 is a square tube-shaped hollow member whose top and bottom are open. The four corners of the body 10 are rounded. The body 10 has a set of bilaterally symmetrical side walls 12 that oppose each other and two walls 11, 15 that are interposed between the two side walls 12.

The wall that is positioned most outward of the two walls 11, 15 is a front wall 15, and the wall that opposes the front wall 15 is a back wall 11. The upper ends of the back wall 11, the two side walls 12, and the front wall 15 form an opening in the upper side of the body 10. This opening is an upper opening 10a.

The lower ends of the back wall 11, the two side walls 12, and the front wall 15 form an opening in the lower side of the body 10. This opening is a lower opening 10b.

The front wall 15 slopes downward toward the back wall 11, and the lower end of the front wall 15 is positioned in a lower position than the lower end of the back wall 11. Therefore, the open surface of the lower opening 10b slopes downward as seen from the lower end of the back wall 11.

Guide plates 13 are attached to the upper ends of each of the side walls 12. The guide plates 13 slope upward and outward of the upper opening 10a from the upper ends of the side walls 12, so they can guide the product to be weighed into the body 10.

A pair of brackets 14 are attached to the back wall 11. The pair of brackets 14 are slender plate-like plate metal members having flat surfaces parallel to the side walls 12. The pair of brackets 14 are attached in a cantilever fashion on the back wall 11. The free ends of each of the brackets 14 extend downward beyond the lower end of the back wall 11. That is, the free ends of each of the brackets 14 extend perpendicularly and downward from the back wall 11.

The distance between the pair of brackets 14 is narrower than the distance between the pair of side walls 12, and the pair of brackets 14 are coupled to each other by two shafts 141 so that the distance between them can be maintained. Furthermore, couplings 142 having surfaces parallel to the back wall 11 are formed in the fixed ends of each of the brackets 14 by bending, and those surfaces are welded to, so as to be in close contact with, the back wall 11. The shafts 141 are caught on predetermined hooks (not shown in the drawings) of the combination weighing apparatus 1 of FIG. 1.

(2-2) Gate 20

The gate 20 opens and closes the lower opening 10b in the body 10. The gate 20 includes a flat portion 21 and bent portions 22. The flat portion 21 is a plate having a sufficient enough area to be able to cover the lower opening 10b. The bent portions 22 are bent so as to rise up along the side walls 12.

A lower end 23 of the flat portion 21 is bent backward. The bend is formed so that when the flat portion 21 closes off the lower opening 10b, the lower end 23 is in close contact with the distal end portion of the front wall 15.

A reinforcement plate 41 is welded to the upper end of the gate 20. An upper end portion extending upward from the reinforcement plate 41 is supported, so as to be freely swingable, by the support shafts 30, and the lever 40 is integrally provided pointing downward from there.

(2-3) Support Shafts 30

The support shafts 30 are shafts that hinge-couple the gate 20 to both side surfaces of the body 10. The support shafts 30 are close to the back wall 11, and when the gate 20 is opened from the lower opening 10b, a sufficient distance is formed between the upper end portion of the gate 20 and the back wall 11. The support shafts 30 are supported by bolts in the couplings 142.

(2-4) Lever 40

The lever 40 flips up the gate 20 in a counter-clockwise direction (looking straight at FIG. 3B) about the support shafts 30. A roller 42 is attached, so as to be freely rotatable, to the distal end portion of the lever 40. The roller 42 meshes with an open/close lever 50 (see FIG. 1), the lever 40 is flipped up in the counter-clockwise direction (looking straight at FIG. 3B), and the gate 20 opens and closes about the support shafts 30 in accompaniment therewith.

(3) Opening and Closing Operations of Gate 20

Here, the gate 20 is connected to a stepping motor 60 via the open/close lever 50. The stepping motor 60 is electrically connected to a control unit 70. The control unit 70 outputs a control signal to the stepping motor 60. When the stepping motor 60 receives the control signal that is output from the control unit 70, it is driven to rotate on the basis of the control signal. Because of this rotation, the open/close lever 50 swings, the lever 40 is flipped up in the counter-clockwise direction (looking straight at FIG. 3B), and the gate 20 opens and closes about the support shafts 30 in accompaniment therewith.

Specifically, the gate 20 shifts from a closed state to an open state as a result of a rotating shaft of the stepping motor 60 positively rotating from 0 degrees to 180 degrees. The gate 20 shifts from an open state to a closed state as a result of the rotating shaft of the stepping motor 60 negatively rotating from 180 degrees to 0 degrees.

FIG. 4A is a block diagram for describing electrical connections in the combination weighing apparatus 1 pertaining to the embodiment.

Referring to FIG. 4A, the control unit 70 has a CPU 71 and a storage unit 73. Stepping motors $60p1$ to $60pn$ that drive gates $20p1$ to $20pn$ of the pool hoppers 4 and stepping motors $60w1$ to $60wn$ that drive gates $20w1$ to $20wn$ of the weigh hoppers 5 are electrically connected via motor drivers to the control unit 70.

The control unit 70 controls the combination weighing apparatus 1 in accordance with a control program stored in the storage unit 73 on the basis of information that is input by the operator via a setting unit.

Specifically, the control unit 70 outputs control signals to motor drivers $68p1$ to $68pn$ to which the stepping motors $60p1$ to $60pn$ are connected and motor drivers $68w1$ to $68wn$ to which the stepping motors $60w1$ to $60wn$ are connected.

Figure 4B:
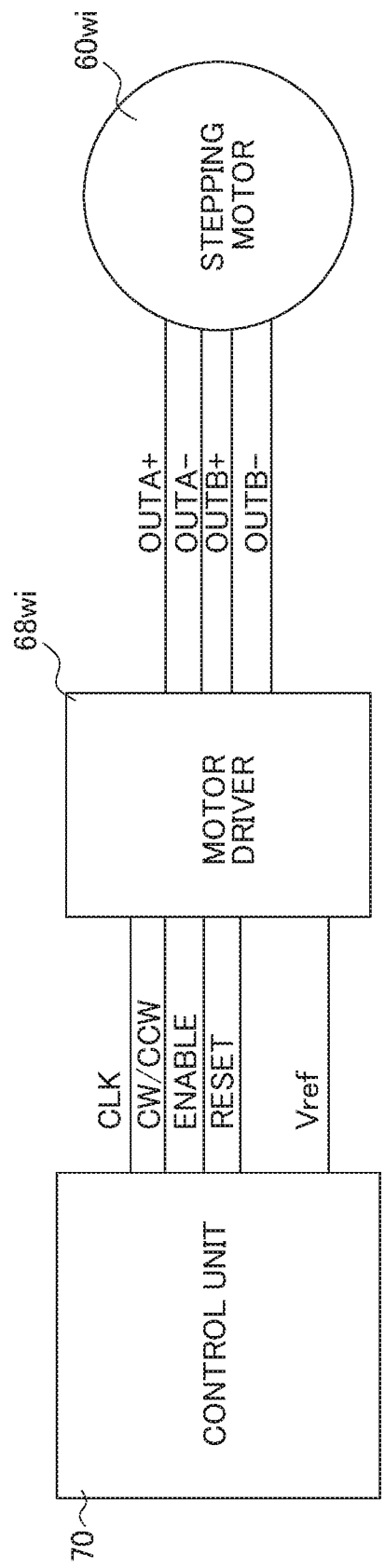
FIG. 4B is a block diagram showing the state of connection between a control unit, a motor driver, and a stepping motor.
Figure 4C:
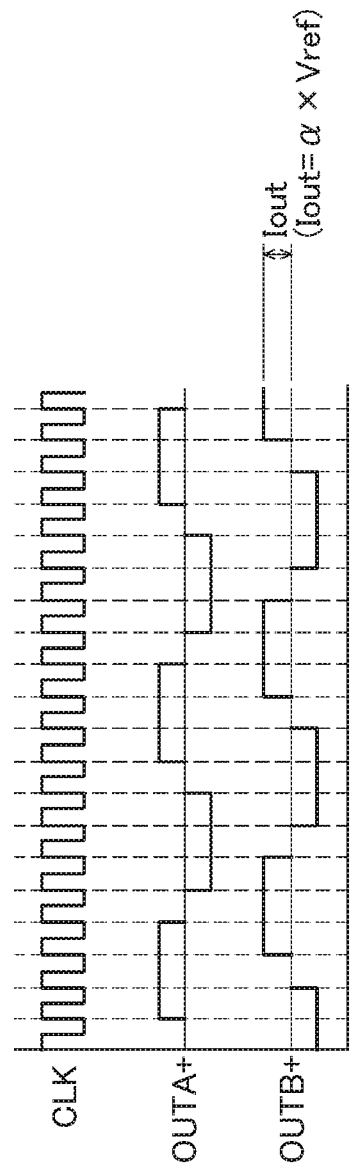
FIG. 4C is a graph showing the relationship between a CLK (clock) signal that is input from the control unit to the motor driver and signals that are output from the motor driver to the stepping motor.

FIG. 4B is a block diagram showing the state of connection between the control unit 70 and an arbitrary motor driver $68wi$ and stepping motor $60wi$. FIG. 4C is a graph showing the relationship between a CLK (clock) signal that is input from the control unit 70 to the arbitrary motor driver $68wi$ and signals that are output from the motor driver $68wi$ to the stepping motor $60wi$.

Referring to FIG. 4B, the control unit 70 is configured to be able to output a CLK (clock) signal, a CW/CCW signal (rotational direction switching signal), an ENABLE signal, a RESET signal, and Vref (reference voltage) to the motor driver $68wi$.

The motor driver $68wi$ is configured to be able to output a voltage value (OUTA+, OUTA−, OUTB+, OUTB−) corresponding to a desired current value (a set current Iout) to the stepping motor $60wi$. The set current Iout of the stepping motor $60wi$ is determined by the voltage set for Vref (reference voltage).

The waveforms of OUTA+ and OUTB+ shown in FIG. 4C represent the case of 1-2 phase excitation. The speed of the stepping motor $60wi$ is determined by the timing of the rising edge of the CLK (clock) signal.

When controlling the speed of the stepping motors $60p1$ to $60pn$ and the stepping motors $60w1$ to $60wn$, the control unit 70 sets Vref (reference voltage) so that voltage values corresponding to current values that each stepping motor needs are output from the motor drivers $68p1$ to $68pn$ and the motor drivers $68w1$ to $68wn$.

Thus, predetermined voltage values are intermittently applied as pulse trains to the stepping motors $60p1$ to $60pn$ and the stepping motors $60w1$ to $60wn$, and the current values flowing in the stepping motors $60p1$ to $60pn$ and the stepping motors $60w1$ to $60wn$ are controlled.

In this case, the pulse voltages are applied to the stepping motors $60p1$ to $60pn$ and the stepping motors $60w1$ to $60wn$ while their pulse widths are temporally changed. In the case of the above configuration, the values that the control unit 70 controls are current values, but it is voltage values that are output to the stepping motors $60p1$ to $60pn$ and the stepping motors $60w1$ to $60wn$.

It will be noted that the method of outputting the voltage values to the stepping motors $60p1$ to $60pn$ and the stepping motors $60w1$ to $60wn$ is not limited to a method where fixed voltage values such as described above are intermittently output as pulse trains, and may also be a method where the voltage values that are output to the stepping motors $60p1$ to $60pn$ and the stepping motors $60w1$ to $60wn$ are temporally varied.

(3-1) Speed of Stepping Motor 60

In this embodiment, assuming that the angular position of the rotating shaft of the stepping motor 60 when the gate 20 is in a closed state is at 0 degrees, the gate 20 is set to reach a completely open state when the rotating shaft of the stepping motor 60 has rotated 180 degrees. Consequently, operations where the angle of rotation of the rotating shaft of the stepping motor 60 progresses from 0 degrees to 180 degrees and thereafter returns from 180 degrees to 0 degrees will comprise one cycle.

In the control unit 70, one cycle is divided into a first interval to an Nth interval, and the control signal that is input to the stepping motor 60 per each of the intervals is set so that speeds that have been set per each of the intervals can be achieved. Here, the control signal that is input to the stepping motor 60 is the voltage value corresponding to the desired current value.

FIG. 5 is a table showing the setting status of speeds of the stepping motor 60. This display is stored in the storage unit of the control unit 70 and can be displayed on a display 80 electrically connected to the control unit 70. It will be noted that input can be made to the control unit 70 via the display 80, and the display 80 also has a function as a setting unit.

It will be noted that in FIG. 5 a "+" sign added before numerical values of speeds means that the stepping motor 60 is rotating in the direction in which it opens the gate and a "−" sign means that the stepping motor 60 is rotating in the direction in which it closes the gate.

Referring to FIG. 5, section number, interval, speed, hold time, slow start, and slow stop columns are provided sequentially from the left side of the table. The section numbers increase or decrease as needed. The intervals are displayed as percentages (%) in which 180 degrees is 100%. The speeds are the rotational speeds of the rotating shaft of the stepping motor 60 in each interval.

For example, section 1 is an interval from 0 to 80% of 0 to 180 degrees, that is, an interval in which the angle of rotation goes from 0 to 144 degrees, and the set speed in this interval is +140 r/m.

Next, section 2, which comes after section 1, is an interval from 80 to 100%, that is, an interval in which the angle of rotation goes from 144 to 180 degrees, and the set speed in this interval is +100 r/m.

Next, section 3, which comes after section 2, is an interval from 100 to 50%, that is, an interval in which the angle of rotation goes from 180 to 90 degrees, and the set speed in this interval is −140 r/m.

Next, section 4, which comes after section 3, is an interval from 50 to 30%, that is, an interval in which the angle of rotation goes from 90 to 54 degrees, and the set speed in this interval is −105 r/m.

Next, section 5, which comes after section 4, is an interval from 30 to 10%, that is, an interval in which the angle of rotation goes from 54 to 18 degrees, and the set speed in this interval is −100 r/m.

Finally, section 6, which comes after section 5, is an interval from 10 to 0%, that is, an interval in which the angle of rotation goes from 18 to 0 degrees, and the set speed in this interval is −190 r/m.

It will be noted that the items of hold time, slow start, and slow stop are unrelated to the invention, so description thereof will be omitted here.

(3-2) Current Values of Stepping Motor 60

Although it is not displayed in FIG. 5, in order to achieve the speeds that have been set per each of the intervals, the current value that is input to the stepping motor 60 is set per each of the intervals, and normally a default current value is applied. The operator can, by touching a "Set Motor Drive Current Pattern" touch button 801 located at the bottom of the table (FIG. 5) displayed on the display 80, switch the display of the display 80 to the table shown in FIG. 6B (a table showing the setting status of the current values per interval) and check the current values per interval.

FIG. 6A is a table showing "Current Levels due to Mechanical Factors" and "Current Levels due to Mechanical Factors+Acceleration Factors" relative to the angle of rotation in one cycle of the stepping motor 60. Furthermore, FIG. 6B is a table showing the setting status of the current values per interval of the angle of rotation.

It will be noted that in FIG. 6A a "+" sign added before numerical values of speeds means that the stepping motor 60 is rotating in the direction in which it opens the gate and a "−" sign means that the stepping motor 60 is rotating in the direction in which it closes the gate.

FIG. 7 is a chart in which a graph showing "Speed" versus the angle of rotation, a graph showing "Current A due to Mechanical Factors" versus the angle of rotation, a graph showing "Current B due to Acceleration Factors" versus the angle of rotation, and a graph showing "Set Current" versus the angle of rotation in one cycle of the stepping motor 60 are arranged sequentially from the top and collectively displayed in order to supplement FIG. 6A and FIG. 6B.

The graph showing "Speed" versus the angle of rotation in the uppermost row of FIG. 7 is a schematization of the set speeds per interval shown in FIG. 5. For convenience of description, starting from the top the four rows in FIG. 7 will be called the uppermost row, the second row, the third row, and the fourth row.

It will be noted that the horizontal axes of the graphs in the second row, the third row, and the fourth row in FIG. 7 represent the angle to which the stepping motor 60 has rotated. For convenience of description, graduations are given in 30-degree spacings, but this is not intended to represent the intervals.

Furthermore, the vertical axes of the graphs in the second row, the third row, and the fourth row in FIG. 7 represent the current level. The current level can be set to any of three levels, "0", "+1", and "+2", starting from low.

For example, referring to FIG. 6A, current level "eco1" corresponds to "0". Current level "half" corresponds to "+1". Current level "full" corresponds to "+2".

It will be noted that in the above description, current level "0" does not mean that the current value is 0 amps; rather, it is a value representing the level of the current value. In other words, current level "0" is a predetermined current value serving as a standard.

(3-2-1) Current A needed by Stepping Motor 60 due to Mechanical Factors

The gate 20 is energized in the closed direction by a spring (not shown in the drawings), so when the rotating shaft of the stepping motor 60 drives the gate 20 in the open direction, the current value increases because the load of the spring acts on the gate 20.

Consequently, in order to maintain a speed of +140 r/m in the interval from 0 to 80%, that is, the interval in which the angle of rotation goes from 0 to 144 degrees, it is necessary to set the current value in even finer intervals.

The left column of FIG. 6B shows default current values per interval. The right column of FIG. 6B shows the setting status of the current values per interval after a change in settings.

The graph in the second row of FIG. 7, which shows "Current A needed due to Mechanical Factors" relative to the angle of rotation, is a graph of the current values per interval listed in the left column of FIG. 6B, and each current value is a default value.

In FIG. 6B and the graph in the second row of FIG. 7, section 1 is an interval from 0 to 15% of the angle of rotation of 0 to 180 degrees, that is, an interval in which the angle of rotation goes from 0 to 27 degrees, and the current value in this interval is set to eco1. The current value settings comprise three level settings of eco1, half, and full (in the current levels of FIG. 7, three level settings of "0", "+1", and "+2"), and have a magnitude correlation of eco1<half<full.

Next, section 2 is an interval from 15 to 35%, that is, an interval in which the angle of rotation goes from 27 to 63 degrees, and the current value in this interval is set to half.

Next, section 3 is an interval from 35 to 65%, that is, an interval in which the angle of rotation goes from 63 to 117 degrees, and the current value in this interval is set to full.

Next, section 4 is an interval from 65 to 85%, that is, an interval in which the angle of rotation goes from 117 to 153 degrees, and the current value in this interval is set to half.

Next, section 5 is an interval from 85 to 100%, that is, an interval in which the angle of rotation goes from 153 to 180 degrees, and the current value in this interval is set to eco1.

Finally, section 6 is an interval from 100 to 0%, that is, an interval in which the angle of rotation goes from 180 to 0 degrees, and the current value in this interval is set to eco1. It will be noted that the interval in which the angle of rotation goes from 180 to 0 degrees is an interval in which the gate 20 returns to the closed state from the open state and can utilize the energizing force of the spring, so the current due to mechanical factors is low and stable.

Generally the current values per interval of the stepping motor 60 are initially set assuming current A due to mechanical factors as shown in the left column of FIG. 6B and the second row of FIG. 7.

However, when actually causing the gate 20 to operate, current B due to the factor of changes in the speed (acceleration) of the stepping motor 60 must also be assumed; otherwise, this leads to a loss of synchronism caused by insufficient torque.

(3-2-2) Current B needed by Stepping Motor 60 due to Acceleration Factors

The graph in the third row of FIG. 7 is a graph representing "Current B needed due to Acceleration Factors" relative to the angle of rotation. For example, the interval from 0 to 11%, that is, the interval in which the angle of rotation goes from 0 to 20 degrees, is an interval in which the stepping motor 60 starts up in order for the gate 20 to start operating from the closed state to the open state, so current for acceleration becomes necessary. Consequently, the current value is set to full.

Furthermore, the interval from 75 to 86%, that is, the interval in which the angle of rotation goes from 135 to 155 degrees, is a deceleration interval for the gate 20 to reliably stop in the completely open position, and current for braking becomes necessary. Consequently, the current value is set to full.

Furthermore, the interval from 94 to 100%, that is, the interval in which the angle of rotation goes from 170 to 180 degrees, is an interval in which the gate 20 becomes completely stopped, and current for braking becomes necessary. Consequently, the current value is set to full.

Furthermore, the interval from 100 to 92%, that is, the interval in which the angle of rotation goes from 180 to 165 degrees, is an interval in which the stepping motor 60 starts up in order for the gate 20 to start operating from the open state to the closed state, so current for acceleration becomes necessary. Consequently, the current value is set to full.

Furthermore, the interval from 56 to 42%, that is, the interval in which the angle of rotation goes from 100 to 75 degrees, is an interval in which the gate 20 is decelerated, and current for braking becomes necessary. Consequently, the current value is set to half.

Finally, the interval from 17 to 0%, that is, the interval in which the angle of rotation goes from 30 to 0 degrees, is an interval in which the gate 20 becomes completely stopped, and current for braking becomes necessary. Consequently, the current value is set to full.

Consequently, referring to FIG. 7, in order to maintain the speed shown in the graph in the uppermost row, it is necessary for the settings to be changed to current values obtained by combining current A needed due to mechanical factors and current B needed due to acceleration factors as shown in the graph in the fourth row.

It will be noted that the operating time of the stepping motor 60 in each interval includes the time from when the control unit increases or decreases Vref (reference voltage) to set the current level to until the current level actually reaches the set value and the time from when the stepping motor 60 starts accelerating or decelerating to until it finishes accelerating or decelerating.

(3-3) Change in Settings of Current Values of Stepping Motor 60

The right column in FIG. 6B follows the graph in the fourth row of FIG. 7 and shows results of having set the intervals and changed the settings of the current values per each of the intervals.

Specifically, referring to the right column of FIG. 6B and the graph in the fourth row of FIG. 7, section 1 is an interval from 0 to 11% of the angle of rotation of 0 to 180 degrees, that is, an interval in which the angle of rotation goes from 0 to 20 degrees, and the current value in this interval is set to full.

Next, section 2 is an interval from 11 to 17%, that is, an interval in which the angle of rotation goes from 20 to 30 degrees, and the current value in this interval is set to eco1.

Next, section 3 is an interval from 17 to 33%, that is, an interval in which the angle of rotation goes from 30 to 60 degrees, and the current value in this interval is set to half.

Next, section 4 is an interval from 33 to 67%, that is, an interval in which the angle of rotation goes from 60 to 120 degrees, and the current value in this interval is set to full.

Next, section 5 is an interval from 67 to 75%, that is, an interval in which the angle of rotation goes from 120 to 135 degrees, and the current value in this interval is set to half.

Next, section 6 is an interval from 75 to 86%, that is, an interval in which the angle of rotation goes from 135 to 155 degrees, and the current value in this interval is set to full.

Next, section 7 is an interval from 86 to 89%, that is, an interval in which the angle of rotation goes from 155 to 160 degrees, and the current value in this interval is set to half.

Next, section 8 is an interval from 89 to 94%, that is, an interval in which the angle of rotation goes from 160 to 170 degrees, and the current value in this interval is set to eco1.

Next, section 9 is an interval from 94 to 100%, that is, an interval in which the angle of rotation goes from 170 to 180 degrees, and the current value in this interval is set to full.

Next, section 10 is an interval from 100 to 92%, that is, an interval in which the angle of rotation goes from 180 to 165 degrees, and the current value in this interval is set to full.

Next, section 11 is an interval from 92 to 56%, that is, an interval in which the angle of rotation goes from 165 to 100 degrees, and the current value in this interval is set to eco1.

Next, section 12 is an interval from 56 to 42%, that is, an interval in which the angle of rotation goes from 100 to 75 degrees, and the current value in this interval is set to half.

Next, section 13 is an interval from 42 to 17%, that is, an interval in which the angle of rotation goes from 75 to 30 degrees, and the current value in this interval is set to eco1.

Finally, section 14 is an interval from 17 to 0%, that is, an interval in which the angle of rotation goes from 30 to 0 degrees, and the current value in this interval is set to full.

(3-4) Action and Effects

As described above, in this embodiment, the operator can, via the display 80 serving as a setting unit, set the angles of rotation (intervals) and speeds of the stepping motor 60, set the angles of rotation (intervals) and current values of the stepping motor 60, and change the current values on the basis of changes in speed (acceleration).

Additionally, when the operator changes the settings of the opening and closing speeds of the gate 20, the control signal that is input to the stepping motor 60, that is, the current value that is input to the stepping motor 60, is changed in conjunction therewith.

For example, in a case where the opening and closing speeds of the gate 20 have been set or changed per each of the intervals to the speeds shown in FIG. 5, the current values per interval are changed in conjunction therewith from the default current values (see the left column of FIG. 6B) to appropriate values (see the right column of FIG. 6B and the fourth row in FIG. 7).

(4) Characteristics (4-1)

In the combination weighing apparatus 1, the control unit 70 controls the stepping motor 60 via the control signal that is input to the stepping motor 60. The control signal that is input to the stepping motor 60 is a voltage value corresponding to a desired current value. The control unit changes the control signal to the stepping motor 60 in conjunction with a change in the settings of the opening and closing speed of the gate 20. As a result, it becomes possible to supply power needed for the operation of the gate 20, and power can be saved.

(4-2)

The combination weighing apparatus 1 includes the display 80 that functions as a setting unit that sets or changes the opening and closing speed of the gate 20, so it becomes possible to reset the opening and closing speed of the gate in a case where the (default) opening and closing speed is unsuitable. The necessary power becomes clear as a result of an optimum opening and closing speed being set, and wasteful supply of power can be avoided so that power can be saved.

(4-3)

In the combination weighing apparatus 1, the period in which the gate 20 goes from a closed state to an open state is divided into plural intervals. Furthermore, the opening and closing speed of the gate is set per each of the intervals. As a result, opening and closing speeds suited to the state of the gate 20 in those intervals can be set. The necessary power becomes clear as a result of optimum opening and closing speeds being set, and wasteful supply of power can be avoided so that power can be saved.

(4-4)

In the combination weighing apparatus 1, the control signal to the stepping motor 60 is set per each of the opening and closing speeds of the gate 20. There is a control signal corresponding to each of the opening and closing speeds, so when an opening and closing speed is changed, the control signal changes to the control signal corresponding to the opening and closing speed that has been changed, so the opening and closing speed is automatically controlled.

(4-5)

In the combination weighing apparatus 1, when the opening and closing speed of the gate 20 has been changed in any interval of the plural intervals, only the control signal corresponding to the interval in which the opening and closing speed of the gate 20 was changed is changed. As a result, for example, in a case where there is an interval in which power is being wastefully consumed, it suffices to simply change the set value of the opening and closing speed of the gate 20 in that interval.

(4-6)

In the combination weighing apparatus 1, the control unit 70 calculates the control signal that accords with the opening and closing speeds of the gate 20. It will be noted regarding the signal value of the control signal that values found by calculation per each of the opening and closing speeds beforehand may also be tabulated.

(4-7)

In the combination weighing apparatus 1, the control unit 70 raises Vref (reference voltage) to increase the voltage level of the control signal in order to increase the current of the stepping motor 60 in a case where the opening and closing speed of the gate 20 has become faster than the opening and closing speed that was utilized when generating the control signal that was initially set. Furthermore, the control unit 70 lowers Vref (reference voltage) to decrease the voltage level of the control signal in order to reduce the current of the stepping motor 60 in a case where the opening and closing speed of the gate has become slower than the opening and closing speed that was utilized when generating the control signal that was initially set.

(5) Example Modification

In the above embodiment, by touching the "Set Motor Drive Current Pattern" touch button 801, the display could be switched from the table in FIG. 5 showing the setting status of the speeds of the stepping motor 60 to the motor drive current pattern setting table appearing in the left column or the right column of the table in FIG. 6B.

However, there was the inconvenience that if the operator does not switch the display, the operator cannot see the setting status of the current values of the stepping motor 60. Thus, in this example modification, the setting status of the speeds of the stepping motor 60 and the setting status of the motor drive current pattern are collectively displayed.

FIG. 8 is a table showing the setting status of current values per interval at an initial setting stage. Referring to FIG. 8, section number, interval, speed, hold time, slow start, slow stop, and power setting columns are provided sequentially from the left of the table. The section numbers increase or decrease in correspondence to the number of intervals. The intervals are displayed as percentages (%) in which 180 degrees is 100%. The speeds are the rotational speeds of the rotating shaft of the stepping motor 60 in each interval.

As in the above embodiment, the items of hold time, slow start, and slow stop are unrelated to the invention, so here description thereof will be omitted.

In this example modification, the operator can set or change the current values in the power setting column while looking at the intervals and the speeds in those intervals.

FIG. 9A is a table showing "Current Levels due to Mechanical Factors" and "Current Levels due to Mechanical Factors+Acceleration Factors" relative to the angle of rotation in one cycle of the stepping motor 60. Furthermore, FIG. 9B is a table showing the setting status of current values per interval after a change in the settings of the opening and closing speeds.

It will be noted that in FIG. 8, FIG. 9A, and FIG. 9B a "+" sign added before numerical values of speeds means that the stepping motor 60 is rotating in the direction in which it opens the gate and a "−" sign means that the stepping motor 60 is rotating in the direction in which it closes the gate.

FIG. 10 is a chart in which a graph showing "Speed" versus the angle of rotation, a graph showing "Current A due to Mechanical Factors" versus the angle of rotation, a graph showing "Current B due to Acceleration Factors" versus the angle of rotation, and a graph showing "Set Current" versus the angle of rotation in one cycle of the stepping motor 60 are arranged sequentially from the top and collectively displayed in order to supplement FIG. 9A and FIG. 9B. For convenience of description, starting from the top the four rows in FIG. 10 will be called the uppermost row, the second row, the third row, and the fourth row.

(5-1) Current A needed by Stepping Motor 60 due to Mechanical Factors

The graph in the second row of FIG. 10, which shows "Current A needed due to Mechanical Factors" relative to the angle of rotation, is a graph of the current values per interval in FIG. 8, and each current value is a default value.

In FIG. 8 and the graph in the second row of FIG. 10, section 1 is an interval from 0 to 80% of the angle of rotation of 0 to 180 degrees, that is, an interval in which the angle of rotation goes from 0 to 144 degrees, and the current value in this interval is set to full. The current value settings comprise three level settings of eco1, half, and full (in the current levels of FIG. 10, three level settings of "0", "+1", and "+2"), and have a magnitude correlation of eco1<half<full.

Next, section 2 is an interval from 80 to 100%, that is, an interval in which the angle of rotation goes from 144 to 180 degrees, and the current value in this interval is set to half. Next, sections 3, 4, and 5 are intervals from 100 to 10%, that is, intervals in which the angle of rotation goes from 180 to 18 degrees, and the current value in these intervals is set to eco1.

Next, section 6 is an interval from 18 to 0%, that is, an interval in which the angle of rotation goes from 18 to 0 degrees, and the current value in this interval is set to full.

(5-2) Current B needed by Stepping Motor 60 due to Acceleration Factors

The graph in the third row of FIG. 10 is a graph representing "Current B needed due to Acceleration Factors" relative to the angle of rotation. For example, the interval from 80 to 86%, that is, the interval in which the angle of rotation goes from 144 to 155 degrees, is a deceleration interval for the gate 20 to reliably stop in the completely open position, and current for braking becomes necessary. Consequently, the current value is set to full.

Furthermore, the interval from 86 to 94%, that is, the interval in which the angle of rotation goes from 155 to 170 degrees, mitigates the braking of the gate 20. Consequently, the current value is set to half.

Furthermore, the interval from 94 to 100%, that is, the interval in which the angle of rotation goes from 170 to 180 degrees, is an interval in which the gate 20 becomes completely stopped, and current for braking becomes necessary. Consequently, the current value is set to full.

Furthermore, the interval from 100 to 91%, that is, the interval in which the angle of rotation goes from 180 to 165 degrees, is an interval in which the stepping motor 60 starts up in order for the gate 20 to start operating from the open state to the closed state, so current for acceleration becomes necessary. Consequently, the current value is set to full.

Furthermore, the interval from 56 to 42%, that is, the interval in which the angle of rotation goes from 100 to 75 degrees, is an interval in which the gate 20 is decelerated, and current for braking becomes necessary. Consequently, the current value should be set to half.

Finally, the interval from 17 to 0%, that is, the interval in which the angle of rotation goes from 30 to 0 degrees, is an interval in which the gate 20 becomes completely stopped, and current for braking becomes necessary. Consequently, the current value should be set to full.

Consequently, referring to FIG. 10, in order to maintain the speed shown in the graph in the uppermost row, it is necessary to change the settings to current values obtained by combining the current A due to mechanical factors and the current B due to acceleration factors as shown in the graph in the fourth row.

(5-3) Change in Settings of Current Values of Stepping Motor 60

FIG. 9B follows the graph in the fourth row of FIG. 10 and shows results of having set the intervals and changed the settings of the current values per each of the intervals.

Specifically, referring to FIG. 9B and the graph in the fourth row of FIG. 10, section 1 is an interval from 0 to 80% of the angle of rotation of 0 to 180 degrees, that is, an interval in which the angle of rotation goes from 0 to 144 degrees, and the current value in this interval is set to full.

Next, section 2 is an interval from 80 to 86%, that is, an interval in which the angle of rotation goes from 144 to 170 degrees, and the current value in this interval is set to half.

Next, section 3 is an interval from 86 to 100%, that is, an interval in which the angle of rotation goes from 170 to 180 degrees, and the current value in this interval is set to full.

Next, section 4 is an interval from 100 to 91%, that is, an interval in which the angle of rotation goes from 180 to 165 degrees, and the current value in this interval is set to full.

Next, section 5 is an interval from 91 to 56%, that is, an interval in which the angle of rotation goes from 165 to 100 degrees, and the current value in this interval is set to eco1.

Next, section 6 is an interval from 56 to 50%, that is, an interval in which the angle of rotation goes from 100 to 90 degrees, and the current value in this interval is set to half.

Next, section 7 is an interval from 50 to 42%, that is, an interval in which the angle of rotation goes from 90 to 75 degrees, and the current value in this interval is set to half.

Next, section 8 is an interval from 42 to 30%, that is, an interval in which the angle of rotation goes from 75 to 54 degrees, and the current value in this interval is set to eco1.

Next, section 9 is an interval from 30 to 17%, that is, an interval in which the angle of rotation goes from 54 to 30 degrees, and the current value in this interval is set to eco1.

Next, section 10 is an interval from 17 to 11%, that is, an interval in which the angle of rotation goes from 30 to 20 degrees, and the current value in this interval is set to full.

Next, section 11 is an interval from 11 to 0%, that is, an interval in which the angle of rotation goes from 20 to 0 degrees, and the current value in this interval is set to full.

As described above, in this example modification, if the operator sets or changes the setting of the control signal that is input to the stepping motor 60, that is, the current value that is input to the stepping motor 60, when setting or changing the settings of the opening and closing speeds of the gate 20, the opening and closing speed of the gate 20 is set or has its setting changed in conjunction therewith.

It will be noted that the operating time of the stepping motor 60 in each interval includes the time from when the control unit increases or decreases Vref (reference voltage) to set the current level to until the current level actually reaches the set value and the time from when the stepping motor 60 starts accelerating or decelerating to until it finishes accelerating or decelerating.

(5-4) Action and Effects

As described above, in this example modification, the operator can, via the display 80 serving as a setting unit, set the angles of rotation (intervals), speeds, and current values of the stepping motor 60 and change the current values on the basis of changes in the speed (acceleration) of the stepping motor 60.

Additionally, when the operator changes the setting of an opening and closing speed of the gate 20, the control signal that is input to the stepping motor 60, that is, the current value that is input to the stepping motor 60, is changed in conjunction therewith.

For example, in a case where the opening and closing speeds of the gate 20 have been set or changed per each of the intervals to the speeds shown in FIG. 8, the current values per interval are changed in conjunction therewith from the default current values (FIG. 8) to appropriate values (see FIG. 9B and the fourth row in FIG. 10).

(6) Characteristics of Example Modification

The example modification includes all the characteristics of the embodiment. In addition, the setting status of the speeds of the stepping motor 60 and the motor drive current pattern setting table are collectively displayed, so the operator can, while looking at the setting status of the speeds of the stepping motor 60, set the angles of rotation (intervals), speeds, and current values of the stepping motor 60 and change the settings of the current values on the basis of a change in the speed (acceleration) of the stepping motor 60.

(7) Other

In the combination weighing apparatus 1, the control unit 70 may also calculate the control signal that accords with the opening and closing speeds of the gate 20. Moreover, regarding the signal value of the control signal, values found by calculation per each of the opening and closing speeds beforehand may also be tabulated.

In this case, the control unit 70 can raise Vref (reference voltage) to increase the voltage level of the control signal in order to increase the current of the stepping motor 60 in a case where the opening and closing speed of the gate 20 has become faster than the opening and closing speed that was utilized when generating the control signal that was initially set. Furthermore, the control unit 70 can lower Vref (reference voltage) to decrease the voltage level of the control signal in order to reduce the current of the stepping motor 60 in a case where the opening and closing speed of the gate has become slower than the opening and closing speed that was utilized when generating the control signal that was initially set.

Furthermore, in the embodiment, an example of motor control effected by a clock input method was described, but the invention is not limited to this and may also utilize motor control effected by a phase input method, for example, or may utilize another control method.

REFERENCE SIGNS LIST

1 Combination Weighing apparatus (Weighing apparatus)
20 Gate
20p1 to 20pn Gates
20w1 to 20wn Gates
60 Stepping Motor
60p1 to 60pn Stepping Motors
60w1 to 60wn Stepping Motors
70 Control Unit

CITATION LIST

Patent Literature

Patent Document 1: JP-A No. 2013-167594

What is claimed is:

1. A weighing apparatus comprising:
   a hopper that has an opening and closing gate and which, by opening and closing the gate, temporarily retains and thereafter discharges product that has been fed thereto from outside;
   a drive unit that causes the gate to open and close; and
   a control unit that controls the drive unit via a control signal,
   wherein the control unit is configured to change current level to the drive unit in conjunction with a change in a setting of the opening and closing speed of the gate.

2. The weighing apparatus according to claim 1, further comprising a setting unit that sets or changes the opening and closing speed of the gate.

3. The weighing apparatus according to claim 1, wherein
   a period in which the gate shifts from a closed state to an open state is divided into plural intervals, and
   the opening and closing speed of the gate is set per each of the intervals.

4. The weighing apparatus according to claim 3, wherein the current level is set per each of the opening and closing speeds of the gate.

5. The weighing apparatus according to claim 4, wherein when the opening and closing speed of the gate has been changed in any interval of the plural intervals, only the current level corresponding to the interval in which the opening and closing speed of the gate was changed is changed.

6. The weighing apparatus according to claim 4, wherein the control unit calculates the current level that accords with the opening and closing speeds of the gate.

7. The weighing apparatus according to claim 1, wherein the control unit
increases the current level in a case where the opening and closing speed of the gate has become faster than the opening and closing speed that was utilized when generating the current level that was initially set and
decreases the current level in a case where the opening and closing speed of the gate has become slower than the opening and closing speed that was utilized when generating the current level that was initially set.

\* \* \* \* \*